US011239726B2

(12) United States Patent
Kim et al.

(10) Patent No.: US 11,239,726 B2
(45) Date of Patent: Feb. 1, 2022

(54) SHAFT STRUCTURE WITH ADJUSTMENT PORTIONS FOR ALIGNMENT WITH ROTOR CENTER OF GRAVITY

(71) Applicant: LG Magna e-Powertrain Co., Ltd., Incheon (KR)

(72) Inventors: Kyeonghwan Kim, Seoul (KR); Yangsoo Lee, Seoul (KR); Gyeongjae Park, Seoul (KR); Hojun Shin, Seoul (KR); Junho Ahn, Seoul (KR); Wonjung Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 16/731,177

(22) Filed: Dec. 31, 2019

(65) Prior Publication Data

US 2020/0212758 A1 Jul. 2, 2020

(30) Foreign Application Priority Data

Jan. 2, 2019 (KR) .................. 10-2019-0000365

(51) Int. Cl.
*H02K 7/00* (2006.01)
*H02K 5/26* (2006.01)
*F16C 3/02* (2006.01)
*H02K 1/28* (2006.01)

(52) U.S. Cl.
CPC .............. *H02K 7/003* (2013.01); *H02K 5/26* (2013.01); *F16C 3/02* (2013.01); *H02K 1/28* (2013.01)

(58) Field of Classification Search
CPC . H02K 7/003; H02K 7/00; H02K 5/26; F16C 3/02; F16C 3/023

USPC ........ 310/261.1, 216.113, 216.121, 216.123, 310/216.116–216.137
See application file for complete search history.

(56) References Cited

U.S. PATENT DOCUMENTS

| | | | | | |
|---|---|---|---|---|---|
| 4,888,866 | A | * | 12/1989 | Hansen | H02K 1/26 29/598 |
| 6,005,749 | A | * | 12/1999 | Ikuta | F16F 15/363 310/51 |
| 7,923,881 | B2 | * | 4/2011 | Ionel | H02K 21/46 310/156.83 |
| 10,177,625 | B2 | * | 1/2019 | Sekii | H02K 7/085 |
| 2001/0051098 | A1 | * | 12/2001 | Kenney | F02M 37/08 417/410.1 |
| 2003/0230944 | A1 | * | 12/2003 | Aiello | F16C 33/1035 310/90.5 |
| 2004/0091187 | A1 | * | 5/2004 | Aiello | G11B 19/2018 384/112 |
| 2007/0222326 | A1 | * | 9/2007 | Ionel | H02K 1/22 310/216.067 |

(Continued)

*Primary Examiner* — Maged M Almawri
(74) *Attorney, Agent, or Firm* — Finnegan, Henderson, Farabow, Garrett & Dunner LLP (57) ABSTRACT

The embodiments of the present disclosure provide a shaft structure of a motor, comprising a housing, a stator disposed inside the housing, and a rotor rotatably disposed inside the stator. The stator may comprise a stator core and a coil wound around the stator core, and the rotor may comprise a rotor core and a rotational shaft coupled to the rotor core. The rotational shaft may comprise a plurality of adjusting portions formed on an outer circumferential surface of the rotational shaft to align a center of gravity of the rotor with a center of the rotational shaft.

15 Claims, 11 Drawing Sheets

(56) References Cited

U.S. PATENT DOCUMENTS

| | | | | |
|---|---|---|---|---|
| 2008/0240935 A1* | 10/2008 | Dong | .................. | F04C 15/0023 |
| | | | | 417/204 |
| 2010/0301698 A1* | 12/2010 | Goto | ........................ | H02K 7/04 |
| | | | | 310/211 |
| 2013/0328439 A1* | 12/2013 | Okada | ..................... | F04B 35/04 |
| | | | | 310/216.117 |
| 2015/0107098 A1* | 4/2015 | Chiang | .................... | H02K 7/04 |
| | | | | 29/732 |
| 2017/0237316 A1* | 8/2017 | Filgertshofer | ........... | H02K 9/22 |
| | | | | 310/52 |
| 2021/0036564 A1* | 2/2021 | Koike | ................... | H02K 21/14 |

\* cited by examiner

SHAFT STRUCTURE WITH ADJUSTMENT PORTIONS FOR ALIGNMENT WITH ROTOR CENTER OF GRAVITY

CROSS-REFERENCE TO RELATED APPLICATION

This application claims the benefit of priority under 35 U.S.C. § 119(a) to Korean Patent Application No. 10-2019-0000365, filed on Jan. 2, 2019, the disclosure of which is incorporated by reference herein in its entirety.

BACKGROUND

1. Technical Field

The present disclosure relates to a shaft structure of a motor, and in particular, to a shaft structure of a motor capable of improving low vibration performance of the motor.

2. Description of the Related Art

In general, a motor includes a rotational shaft configured to be rotatable, a rotor provided with a rotor core coupled to the rotational shaft, and a stator fixedly disposed inside a housing. The stator is installed with a spacing along a circumference of the rotor.

The stator is wound with a coil forming a rotating magnetic field and induces the rotor to be rotated by electrical interaction with the rotor.

Figure 1:
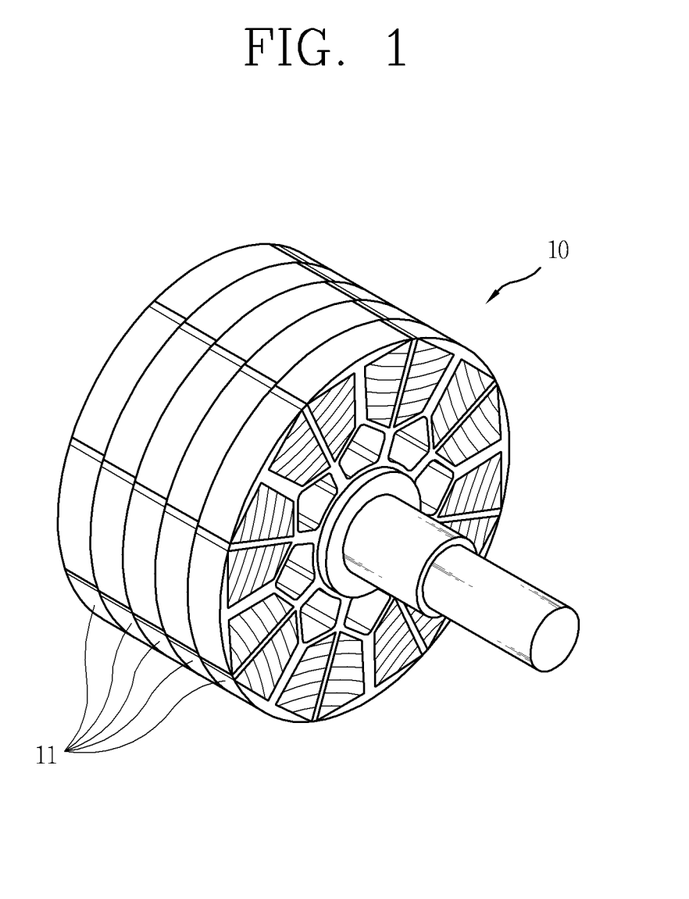
FIG. 1 is a perspective view illustrating a rotor provided in a related art motor.
Figure 2:
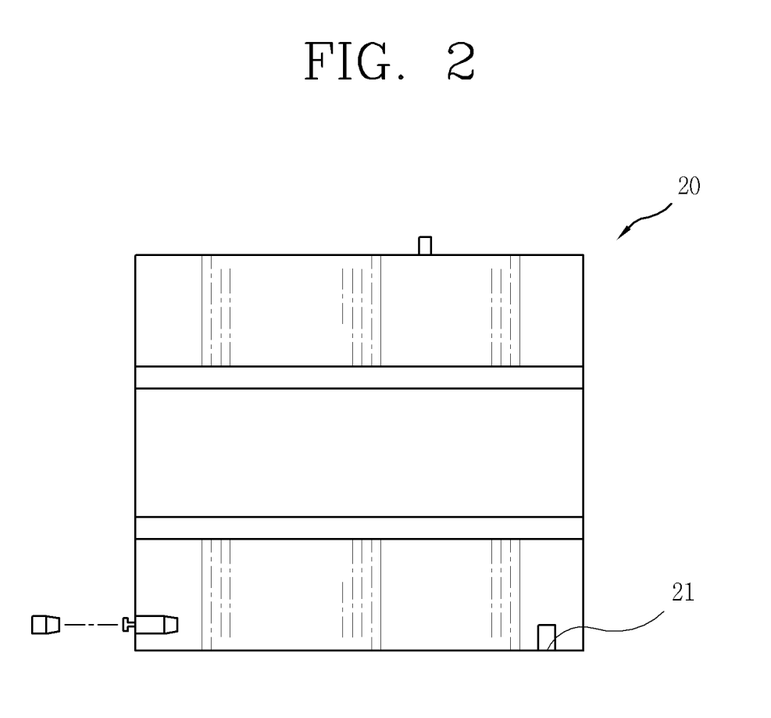
FIG. 2 is a sectional view illustrating an end ring provided in a related art motor.

In relation to the motor, FIG. 1 is a perspective view illustrating a rotor provided in a related art motor, and FIG. 2 is a sectional view illustrating an end ring provided in the related art motor.

As illustrated in FIGS. 1 and 2, the rotor 10 provided in the related art motor is manufactured by stacking rotor plates in a shape of a thin plate to form a plurality of rotor cores 11 and press-fitting a rotational shaft 13 into each of the rotor cores 11.

In this case, the rotor 10 may be manufactured in a skew type in which the plurality of rotor cores 11 is skewed at a predetermined angle in order to reduce a cogging torque.

In addition, the rotor 10 may be manufactured by coupling a can or a molding member to surround an outer side of the rotor cores 11 which are twisted at a skew angle.

However, in the case of the related art motor as described above, a center of gravity of the rotor 10 is off the rotational shaft 13, which causes a problem by greatly increasing vibration or noise during an operation of the motor.

In addition, since a separate balancing hole 21 must be drilled in an end ring 20 to adjust the center of gravity of the rotor 10 to a central portion on the rotational shaft 13, there is a problem in that the manufacturing process becomes very complicated.

SUMMARY

The present disclosure has been made to solve the above problems, and an aspect of the detailed description is to provide a shaft structure of a motor capable of improving low vibration performance of the motor.

Another aspect of the detailed description is to provide a shaft structure of a motor capable of improving low vibration performance of the motor by moving a center of gravity of a rotor to a center of a rotational shaft. The center of gravity of the rotor may be moved to the center of the rotational shaft by differently setting widths of adjusting portions formed on an outer circumferential surface of the rotational shaft depending on distances from the center of gravity of the rotor.

To achieve these and other advantages and in accordance with the purpose of the detailed description, as embodied and broadly described herein, there is provided a shaft structure of a motor, the structure comprising a housing, a stator disposed inside the housing, and a rotor rotatably disposed inside the stator. The stator may comprise a stator core and a coil wound around the stator core, and the rotor may comprise a rotor core and a rotational shaft coupled to the rotor core. The rotational shaft may comprise a plurality of adjusting portions formed on an outer circumferential surface of the rotational shaft to align a center of gravity of the rotor with a center of the rotational shaft.

The plurality of adjusting portions may comprise grooves in a shape of a slot.

The plurality of adjusting portions may have different widths based on distances to the center of gravity of the rotor.

The plurality of adjusting portions may have larger widths closer to the center of gravity of the rotor.

The plurality of adjusting portions may be disposed in an axial direction of the rotational shaft.

The rotor core may comprise protrusions formed on an inner circumferential surface of the rotor core. The protrusions may be configured to be inserted into the plurality of adjusting portions, respectively.

The protrusions may be disposed in an axial direction of the rotor core corresponding to the plurality of adjusting portions.

In addition, a shaft structure of a motor according to an embodiment of the present disclosure may comprise a housing having an inner space, a stator disposed in the inner space, and a rotor rotatably disposed inside the stator.

The rotor may comprise a rotor core, and a rotational shaft inserted through the rotor core.

The rotational shaft may comprise a plurality of adjusting portion recessed into an outer circumferential surface of the rotational shaft in a radial direction.

The plurality of adjusting portions may be formed by a predetermined length along an axial direction of the rotational shaft.

The plurality of adjusting portions may be recessed by different widths relative to one another based on distances from a center of gravity of the rotor.

In addition, the widths, at which the plurality of adjusting portions may be recessed, may increase toward the center of gravity of the rotor.

The widths, at which the plurality of adjusting portions may be recessed, may decrease away from the center of gravity of the rotor.

In addition, one of the plurality of adjusting portions may be spaced a first distance from the center of gravity of the rotor, and another adjusting portion of the plurality of adjusting portions may be spaced a second distance, greater than the first distance, from the center of gravity of the rotor. The one adjusting portion may be recessed by a width greater than that of the another adjusting portion.

The plurality of adjusting portions may be recessed by different volumes relative to one another based on distances from a center of gravity of the rotor.

In addition, the volumes, at which the plurality of adjusting portions may be recessed, may increase toward the center of gravity of the rotor.

The volumes, at which the plurality of adjusting portions may be recessed, may decrease away from the center of gravity of the rotor.

In addition, one of the plurality of adjusting portions may be spaced a first distance apart from the center of gravity of the rotor, and another adjusting portion of the plurality of adjusting portions may be spaced a second distance, greater than the first distance, from the center of gravity of the rotor. The one adjusting portion may be recessed by a volume a greater than that of the another adjusting portion.

As described above, a shaft structure of a motor according to the present disclosure may configure a plurality of adjusting portions on an outer circumferential surface of a rotational shaft and allow the adjusting portions to have different widths depending on distances to a center of gravity of a rotor, such that the center of gravity of the rotor can move toward a center of the rotational shaft. This may result in preventing unnecessary vibration caused during rotation of the rotor.

Since the center of gravity of the rotor is moved by allowing the adjusting portions to have different widths depending on distances to the center of gravity of the rotor, separate balancing may not need to be performed with respect to an end ring to adjust the center of gravity of the rotor.

Without the need of performing the separate balancing with respect to the end ring, a manufacturing process can be simplified.

Without the need of forming separate balancing holes for balancing in the end ring, the end ring can be minimized in size.

DETAILED DESCRIPTION OF THE EMBODIMENTS

Hereinafter, description will be given in detail of a shaft structure of a motor according to an embodiment of the present disclosure, with reference to the accompanying drawings.

Figure 3:
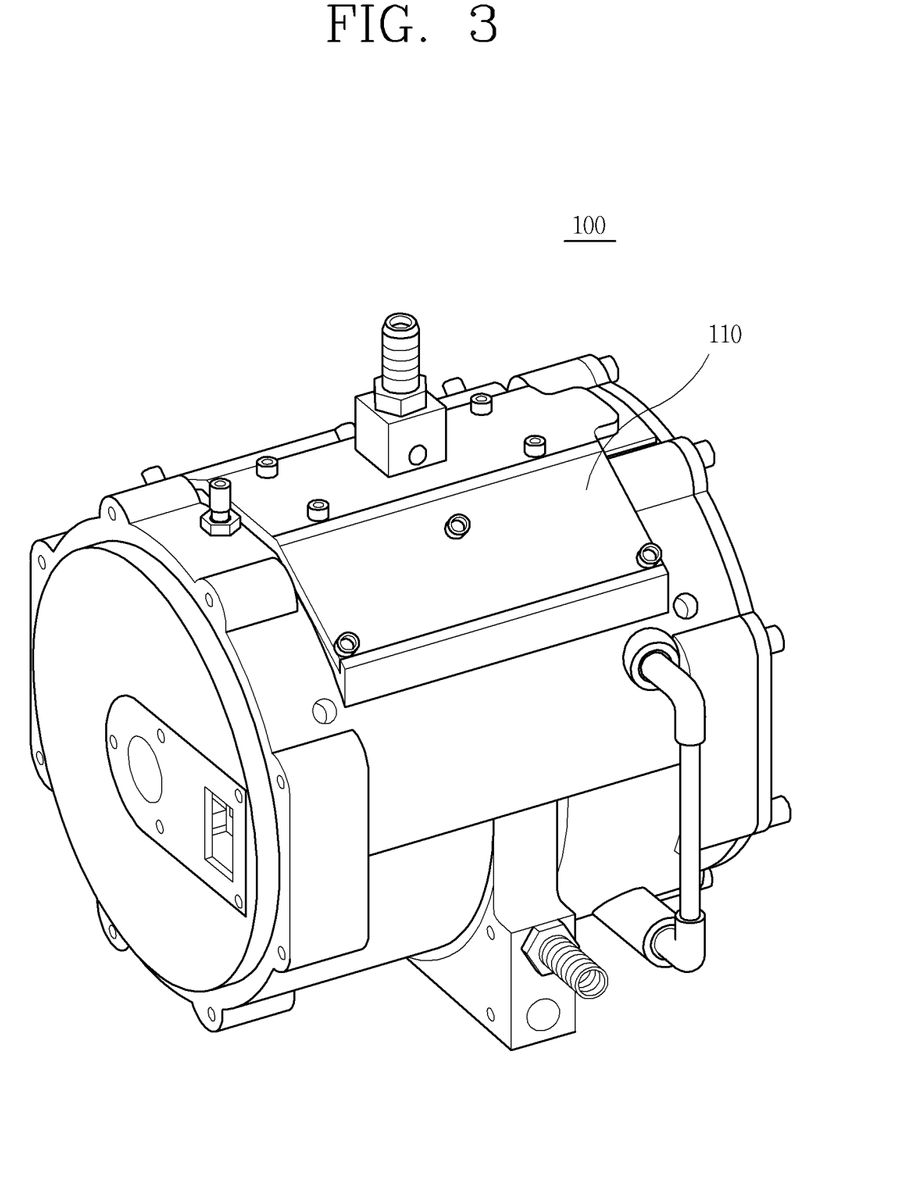
FIG. 3 is a perspective view illustrating a motor having a rotational shaft in accordance with an embodiment of the present disclosure.
Figure 4:
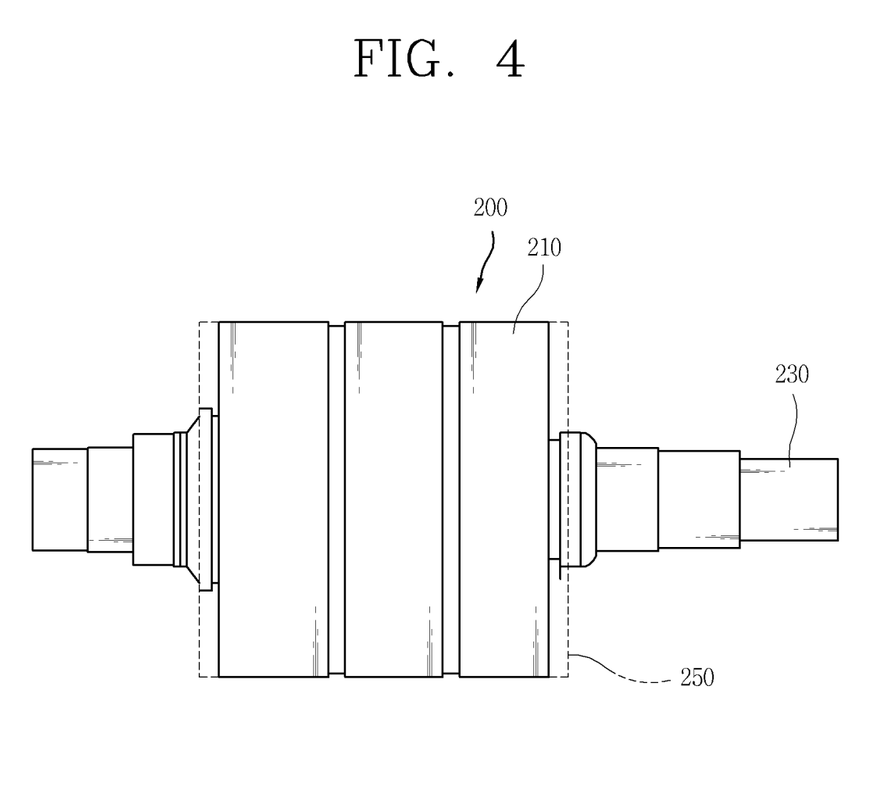
FIG. 4 is a lateral view illustrating a rotor provided in a motor in accordance with an embodiment of the present disclosure.

FIG. 3 is a perspective view illustrating a motor having a rotational shaft in accordance with an embodiment of the present disclosure, and FIG. 4 is a lateral view illustrating a rotor provided in a motor in accordance with an embodiment of the present disclosure.

As illustrated in FIGS. 3 to 4, a motor 100 according to an embodiment may comprise a housing 110, a stator (not shown), a rotor 200, and end rings 250.

The housing 110 may provide a space in which the stator and the rotor 200 can be accommodated, and may be formed in a tubular shape having a circular cross section with both ends open.

The housing 110 may be formed of aluminum or the like having thermal conductivity.

The stator may be located adjacent to an inner circumferential surface of the housing 110.

The stator may comprise a stator core (not shown) and a coil wound around the stator core (not shown).

The stator core may be provided inside the housing 110 and may be formed by stacking a plurality of steel sheets each in a shape like "H" having a thin thickness.

The coil may be wound a predetermined number of turns on a concave portion of the stator.

The rotor 200 may be positioned at a central portion of the stator and may rotate while interacting with a magnetic field formed in the stator.

The rotor 200 may comprise a rotor core 210 and a rotational shaft 230.

The rotor core 210 may be located at the central portion of the stator and rotate while interacting with the magnetic field formed in the stator.

Here, a rotational shaft insertion hole 213 may be formed through the rotor core 210 so that the rotational shaft 230 can be inserted, and a magnetic field forming portion 211 may be provided to form a magnetic field.

The rotational shaft insertion hole 213 may be formed through the rotor core in an axial direction, so that the rotational shaft 230 can be inserted therethrough so as to rotate together with the rotor core 210.

The magnetic field forming portion 211 may comprise a magnet 211a and a slot 211b, into which the magnet 211a can be inserted.

This embodiment exemplarily illustrates the magnetic field forming portion 211 configured such that the magnets 211a can be inserted into the slots 211b, respectively. However, this is merely illustrative, and the present disclosure is not limited thereto.

For example, the magnetic field forming portion 211 may be configured to comprise a plurality of conductor bars and end rings (or shorting rings), and a plurality of flux barriers (not shown) having large magnetic resistance may be disposed in a spaced manner along a circumferential direction of the rotor core 210.

The rotational shaft 230 may be inserted through the rotational shaft insertion hole 213 of the rotor core 210, and both sides of the rotational shaft 230 may be rotatably connected to brackets (not shown) provided in the housing 110.

The end rings 250 may be provided at both sides of the rotor core 210 to compressively support the rotor core 210 at the both sides.

Figure 5:
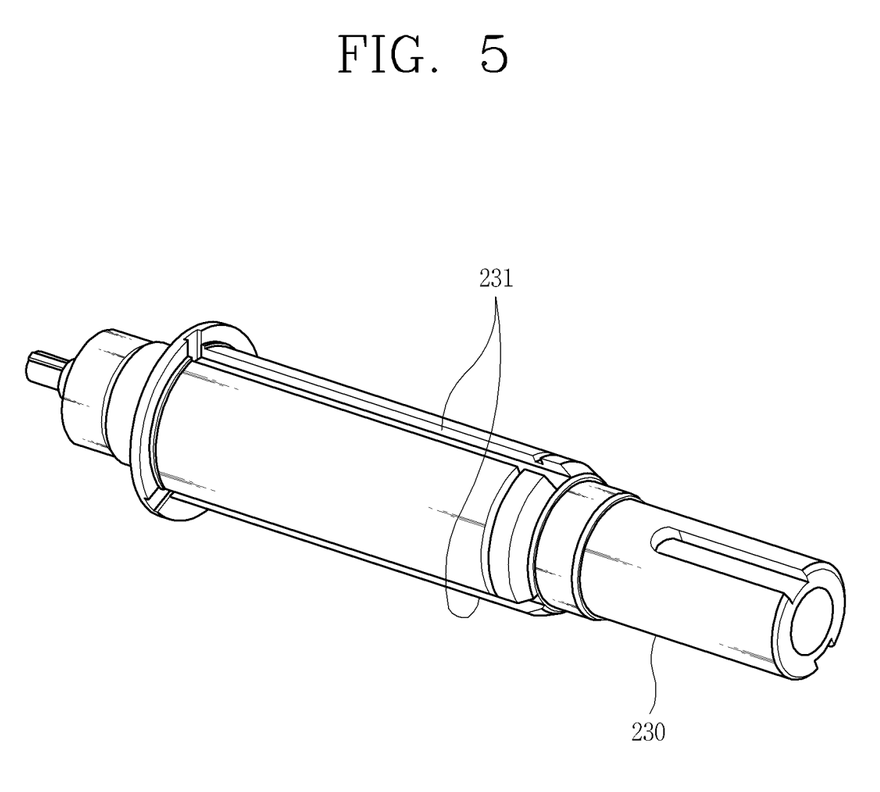
FIG. 5 is a perspective view illustrating a rotational shaft of a rotor provided in a motor in accordance with an embodiment of the present disclosure.
Figure 6:
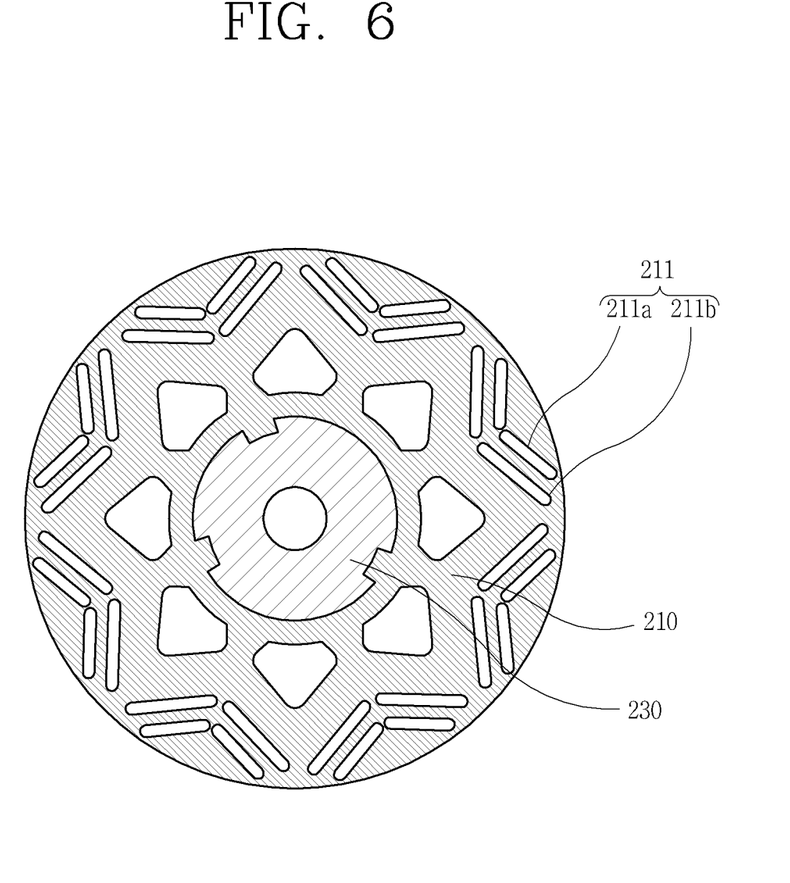
FIG. 6 is a sectional view illustrating a rotor provided in a motor in accordance with an embodiment of the present disclosure.

On the other hand, FIG. 5 is a perspective view illustrating a rotational shaft having a rotor provided in a motor in accordance with an embodiment of the present disclosure, and FIG. 6 is a sectional view illustrating the rotor provided in the motor in accordance with the an embodiment of the present disclosure.

As illustrated in FIGS. 5 and 6, the rotational shaft 230 may be provided with adjusting portions 231, 233, 235 to adjust a center of gravity of the rotor 200.

Adjusting portions 231, 233, 235 may be formed on an outer circumferential surface of the rotational shaft 230 and may adjust the center of gravity of the rotor 200 to be aligned with (or to match) a center of the rotational shaft 230.

In particular, the rotor 200 may be manufactured in a skew type in which a plurality of rotor cores are skewed at a predetermined angle in order to reduce a cogging torque, and the motor having the skew type rotor 200 may have difficulty in aligning (matching) the center of gravity of the rotor 200 with the center of the rotational shaft 230.

Therefore, the present disclosure may be provided with adjusting portions 231, 233, 235 on the outer circumferential surface of the rotational shaft 230 to adjust the center of gravity of the rotor 200 to be aligned with the center of the rotational shaft 230, thereby preventing vibration from being unnecessarily increased while the motor 100 is driven, due to a misalignment between the center of gravity of the rotor 200 and the center of the rotational shaft 230.

On the other hand, adjusting portions 231, 233, 235 may be provided in plurality on the outer circumferential surface of the rotational shaft 230.

Here, adjusting portions 231, 233, and 235 may be a groove in a shape of a slot.

This embodiment exemplarily illustrates the configuration that adjusting portions 231, 233, 235 are grooves in the shape of slots. However, this is merely illustrative and the present disclosure is not necessarily limited thereto.

For example, adjusting portions 231, 233, 235 may be configured as a semicircular groove, or may be configured as a protrusion.

On the other hand, adjusting portions 231, 233, and 235 may have different widths depending on distances to the center of gravity of the rotor 200.

In particular, adjusting portions 231, 233, and 235 may have a larger width closer to the center of gravity of the rotor 200.

Figure 7:
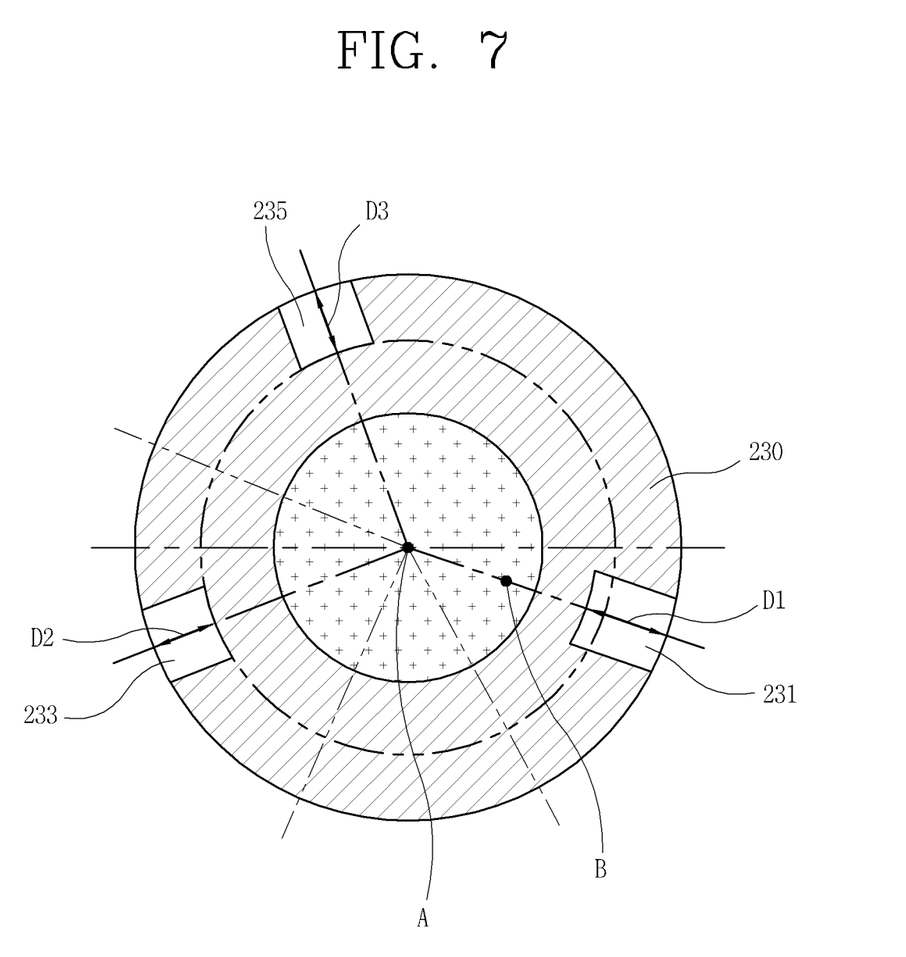
FIG. 7 is a sectional view illustrating a rotational shaft of a rotor provided in a motor in accordance with an embodiment of the present disclosure.

In detail, as illustrated in FIG. 7, when the center of the rotor core 210 is measured as point B when the center of the rotor core 210 and the rotational shaft 230 is point A, the adjusting portion 231 which is located most adjacent to point B may have a width D1 larger than widths D2 and D3 of the other adjusting portions 233 and 235.

That is, when the center of gravity of the rotor 200 is point B, when the width D1, a cross-section, and a volume of the adjusting portion 231 located closest to point B are made large, a weight of the rotor 200 near point B may be reduced and accordingly a position of the center of gravity may be adjusted to move (change) from point B to point A.

In addition, the widths D2 and D3 of the other adjusting portions 233 and 235 may also be changed depending on the distances to point B, so that the center of gravity of the rotor 200 can be adjusted to be finally aligned with point A by virtue of each of the adjusting portions 231, 233, and 235.

Figure 8:
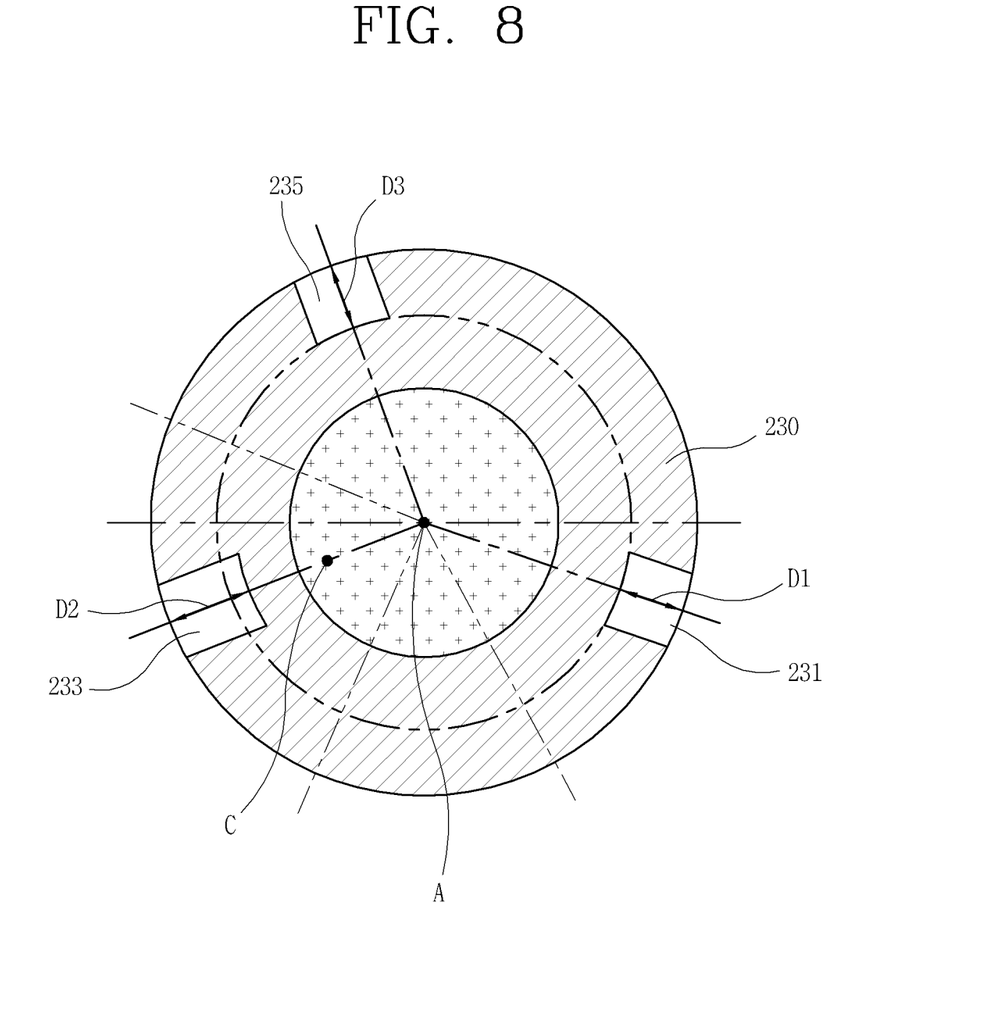
FIG. 8 is a sectional view illustrating a rotational shaft of a rotor provided in a motor in accordance with another embodiment of the present disclosure.

As illustrated in FIG. 8, when the center of gravity of the rotor 200 is measured as point C where the center of the rotor core 210 and the rotational shaft 230 is point A, the adjusting portion 233 which is located most adjacent to point C may have a width D2 larger than widths D1 and D3 of the other adjusting portions 231 and 235. Since the adjusting portion 233 which is located closest to point C is formed to have the largest width (cross-section and volume), the weight of the rotor 200 near point C may be reduced. Accordingly, the position of the center of gravity of the rotor 200 may move (changes) from point C to point A which is the center of the rotational shaft 230. Thus, the position of the center of gravity of the rotor 200 may be adjusted to finally move from point C to point A based on the differences from the widths D1 and D3 of the other adjusting portions 231 and 235.

Figure 9:
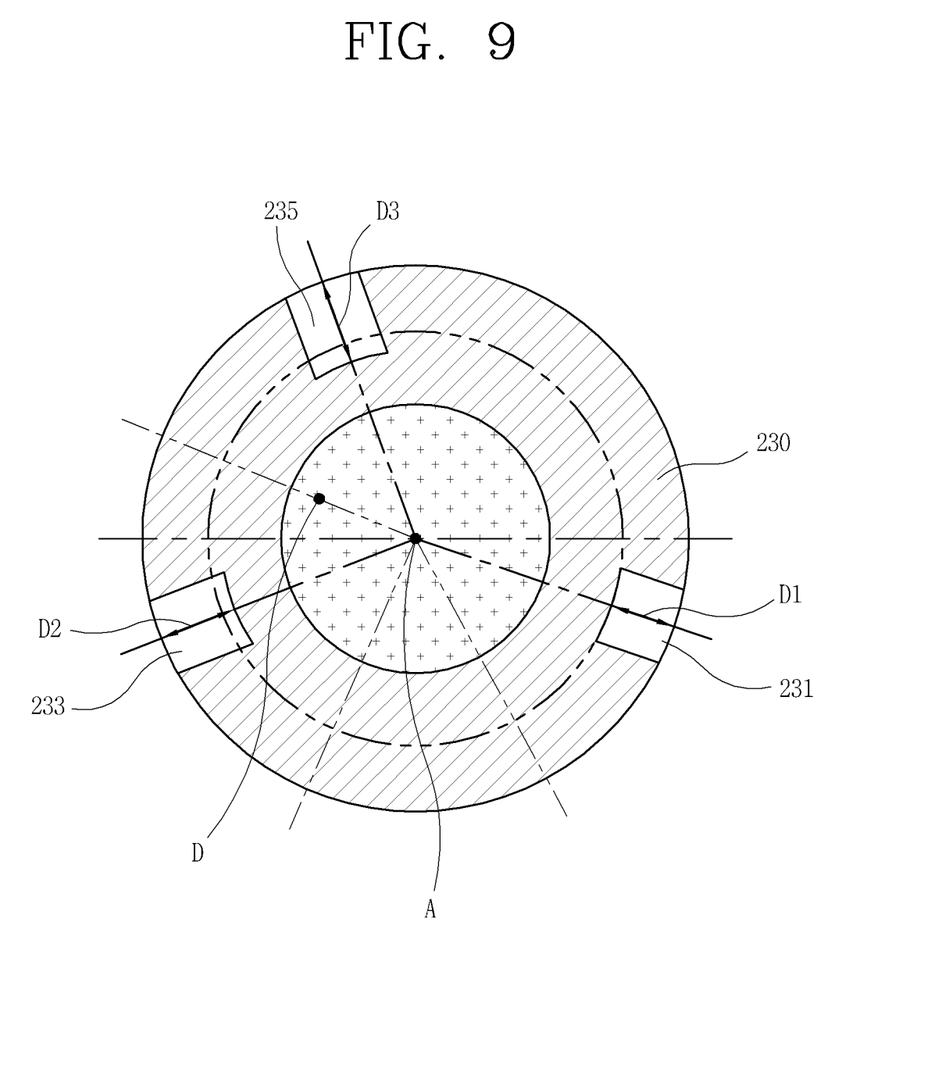
FIG. 9 is a sectional view illustrating a rotational shaft of a rotor provided in a motor in accordance with still another embodiment of the present disclosure.

In addition, as illustrated in FIG. 9, when the center of gravity of the rotor 200 is located at point D, when the distances between the center of gravity of the rotor 200 and the adjacent adjusting portions 233 and 235 are similar to each other, the widths D2 and D3, cross-sections, and volumes of the adjusting portions 233 and 235 located at the similar distances may be made the same, and the width D1, cross-section, and volume of the other adjusting portion 231 may be made smaller, so that the center of gravity of the rotor 200 can be adjusted to move from point D to point A which is the center of the rotational shaft 230.

Figure 10:
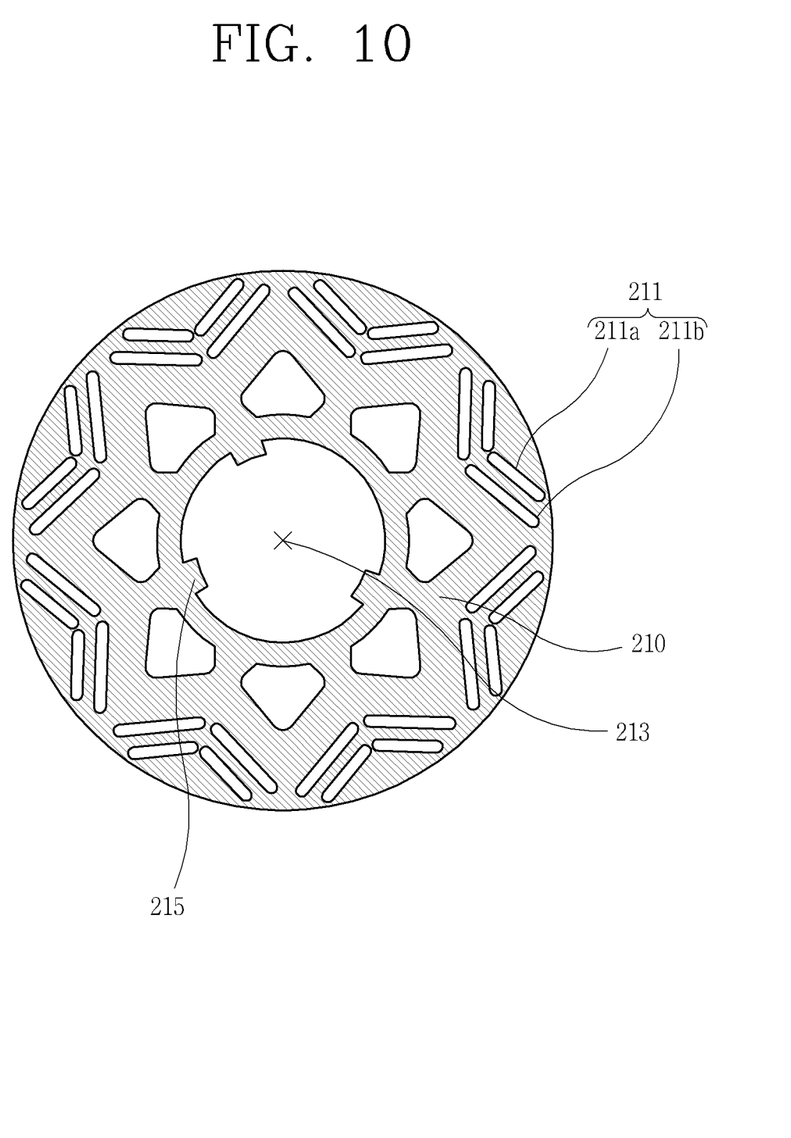
FIG. 10 is a sectional view illustrating a state in which a rotational shaft is removed from a rotor provided in a motor in accordance with an embodiment of the present disclosure.

On the other hand, FIG. 10 is a sectional view illustrating a state in which a rotational shaft is removed from a rotor provided in a motor in accordance with an embodiment of the present disclosure.

As illustrated in FIG. 10, protrusions 215 may be formed on an inner circumferential surface of the rotor core 210 to be inserted into adjusting portions 231, 233, and 235, respectively.

Adjusting portions 231, 233, and 235 may be formed in the axial direction of the rotational shaft 230, and the protrusions 215 may be formed in the axial direction of the rotor core 210 to correspond to adjusting portions 231, 233, and 235.

Therefore, when the rotational shaft 230 is inserted into the rotational shaft insertion hole 213 of the rotor core 210, the protrusions 215 may be inserted into adjusting portions 231, 233, and 235, respectively. Accordingly, the rotational shaft 230 can rotate together with the rotor core 210 in the inserted state in the rotor core 210, without movement in the circumferential or axial direction, by virtue of the protrusions 215 and adjusting portions 231, 233, and 235.

In addition, without a separate configuration on the outer circumferential surface of the rotor core 210 for inserting the protrusions 215, the protrusions 215 can be fixedly inserted into adjusting portions 231, 233, and 235 formed as grooves in a slot-like shape, which may result in simplifying an entire structure.

Figure 11:
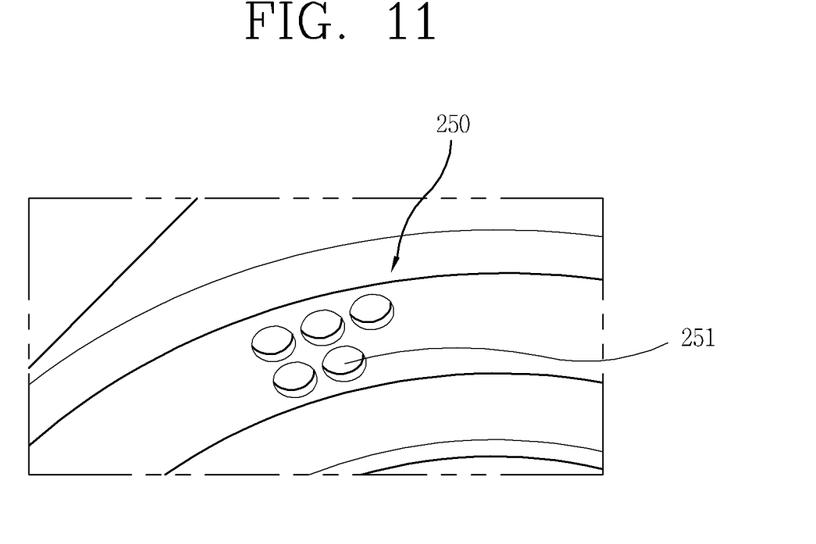
FIG. 11 is a partially enlarged view illustrating a state in which balancing holes are formed in an end ring provided in a motor in accordance with an embodiment of the present disclosure.

On the other hand, FIG. 11 is a partially enlarged view illustrating a state in which balancing holes are formed in an end ring provided in a motor in accordance with an embodiment of the present disclosure.

As illustrated in FIG. 11, a plurality of balancing holes 251 may be formed in each end ring 250.

The balancing holes 251 may compensate for a non-uniform mass caused by manufacturing tolerance between the rotor core 210 constituting the rotor 200 and the rotational shaft 230, so as to maintain the balance of the rotor 200.

According to the present disclosure having the configuration, the plurality of adjusting portions 231, 233, and 235 may be formed on the outer circumferential surface of the rotational shaft 230 to have different widths depending on distances to the center of gravity of the rotor 200, so that the center of gravity of the rotor 200 can move toward the center of the rotational shaft 230. This may result in preventing unnecessary vibration during the rotation of the rotor 200 due to the misalignment between the center of gravity of the rotor 200 and the center of the rotational shaft 230.

The widths of adjusting portions 231, 233, and 235 may be made differently according to the distances to the center of gravity of the rotor 200, so that the center of gravity of the rotor 200 can be adjusted to be aligned with the center of the rotational shaft 230. Therefore, it may not be necessary to perform a separate balancing process of forming the balancing holes 251 in the end ring 250 for the adjustment of the center of gravity of the rotor.

In addition, without the need of performing the separate balancing process with respect to the end ring 250, an entire manufacturing process can be simplified.

In addition, without the need of forming the balancing holes 251 for balancing in the end ring 250, the end ring 250 can be minimized in size.

So far, the preferred embodiment disclosed herein has been described, but various modifications, changes and equivalents may be used. Also, the preferred embodiment may be appropriately modified and applied in the same manner. Therefore, it will be understood that the foregoing description does not limit the scope of the disclosure as defined by the limitations of the following claims.

What is claimed is:

1. A shaft structure of a motor, the structure comprising:
   a housing;
   a stator disposed inside the housing, the stator comprising a stator core and a coil wound around the stator core; and
   a rotor rotatably disposed inside the stator, the rotor comprising a rotor core and a rotational shaft coupled to the rotor core,
   wherein the rotational shaft comprises a plurality of adjusting portions formed on an outer circumferential surface of the rotational shaft to align a center of gravity of the rotor with a center of the rotational shaft, wherein:
      the plurality of adjusting portions comprise grooves in a shape of a slot,
      the plurality of adjusting portions are recessed by different volumes relative to each other based on distances from the center of gravity of the rotor,
      one adjusting portion of the plurality of adjusting portions is spaced a first distance from the center of gravity of the rotor,
      another adjusting portion of the plurality of adjusting portions is spaced a second distance from the center of gravity of the rotor, the second distance being greater than the first distance, and
      the one adjusting portion is recessed by a volume greater than that of the another adjusting portion.

2. The motor of claim 1, wherein the volumes, at which the plurality of adjusting portions are recessed, increase toward the center of gravity of the rotor.

3. The motor of claim 1, wherein the volumes, at which the plurality of adjusting portions are recessed, decrease away from the center of gravity of the rotor.

4. The structure of claim 1, wherein the plurality of adjusting portions have different widths based on distances to the center of gravity of the rotor.

5. The structure of claim 4, wherein the plurality of adjusting portions have larger widths closer to the center of gravity of the rotor.

6. The structure of claim 4, wherein the plurality of adjusting portions are disposed in an axial direction of the rotational shaft.

7. The structure of claim 6, wherein the rotor core comprises protrusions formed on an inner circumferential surface of the rotor core, the protrusions being configured to be inserted into the plurality of adjusting portions, respectively.

8. The structure of claim 7, wherein the protrusions are disposed in an axial direction of the rotor core corresponding to the plurality of adjusting portions.

9. A motor comprising:
   a housing having a space;
   a stator disposed in the space of the housing; and
   a rotor rotatably disposed inside the stator,
   wherein the rotor comprises a rotor core and a rotational shaft inserted through the rotor core,
   the rotational shaft comprises a plurality of adjusting portions recessed into an outer circumferential surface of the rotational shaft in a radial direction,
   the plurality of adjusting portions are formed by a predetermined length along an axial direction of the rotational shaft, wherein:
      the plurality of adjusting portions are recessed by different widths relative to one another based on distances from a center of gravity of the rotor,
      one adjusting portion of the plurality of adjusting portions is spaced a first distance from the center of gravity of the rotor,
      another adjusting portion of the plurality of adjusting portions is spaced a second distance from the center of gravity of the rotor, the second distance being greater than the first distance, and
      the one adjusting portion is recessed by a width greater than that of the another adjusting portion.

10. The motor of claim 9, wherein the widths, at which the plurality of adjusting portions are recessed, increase toward the center of gravity of the rotor.

11. The motor of claim 9, wherein the widths, at which the plurality of adjusting portions are recessed, decrease away from the center of gravity of the rotor.

12. The motor of claim 9, wherein the plurality of adjusting portions are recessed by different volumes relative to one another based on distances from the center of gravity of the rotor.

13. The motor of claim 12, wherein the volumes, at which the plurality of adjusting portions are recessed, increase toward the center of gravity of the rotor.

14. The motor of claim 12, wherein the volumes, at which the plurality of adjusting portions are recessed, decrease away from the center of gravity of the rotor.

15. The motor of claim 12, wherein:
   one of the plurality of adjusting portions is spaced a first distance from the center of gravity of the rotor,
   another adjusting portion of the plurality of adjusting portions is spaced a second distance from the center of gravity of the rotor, the second distance being greater than the first distance, and
   the one adjusting portion is recessed by a volume greater than that of the another adjusting portion.

* * * * *